Aug. 23, 1932.  E. T. BURTON  1,873,283

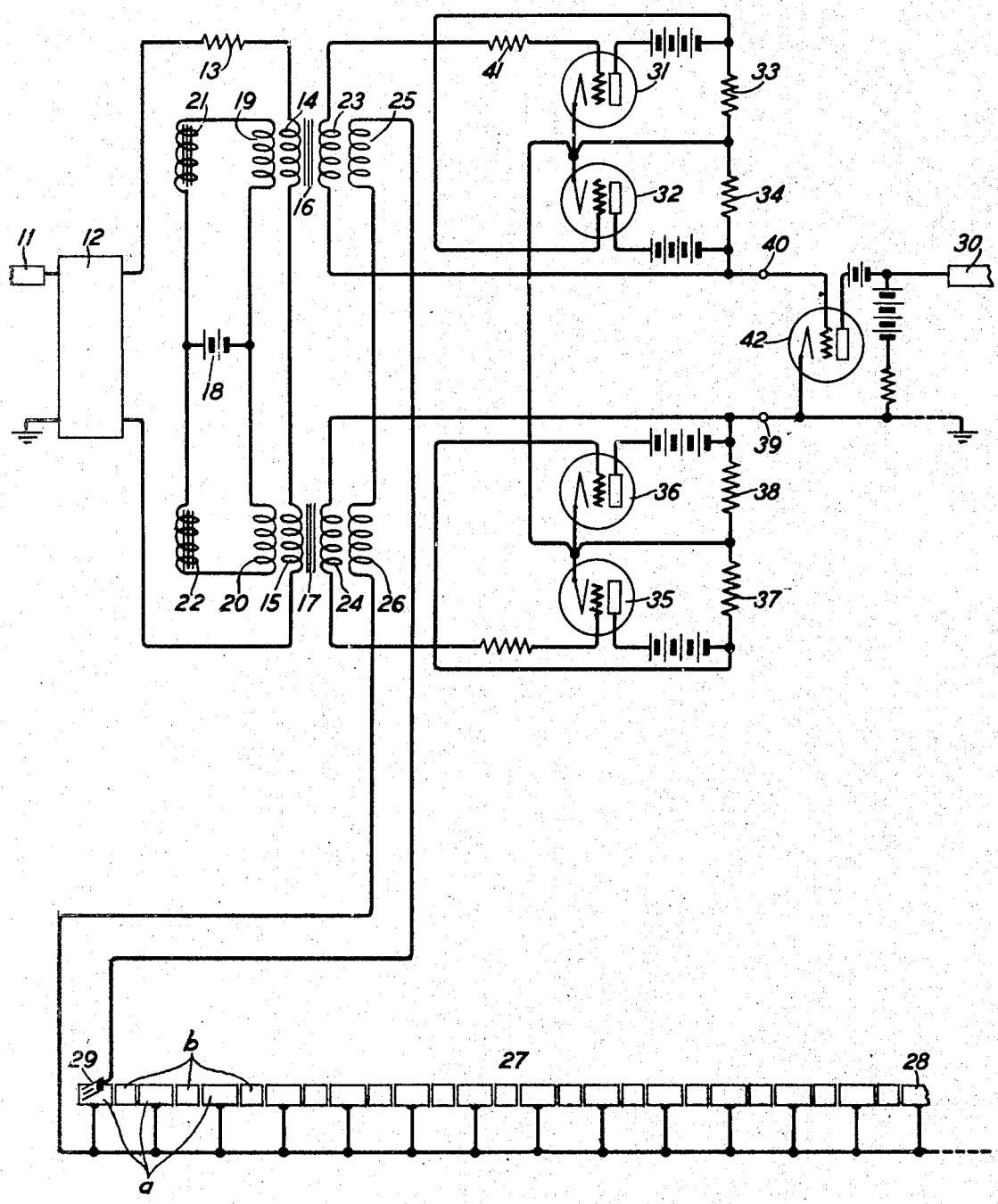

TELEGRAPH REPEATER

Filed May 14, 1931  2 Sheets-Sheet 2

FIG. 2.

WITH "CHOPPER" SEGMENTS—IMPULSE COILS WORKING AT Z AND Z' OF CURVE D

A  TRANSMITTED SIGNAL

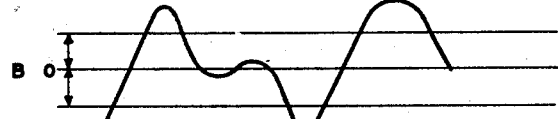

B  RECEIVED SIGNAL (WITHOUT INTERFERENCE)

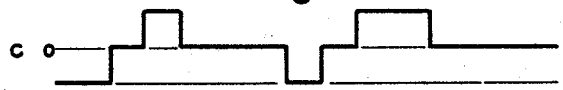

C  RECEIVING RELAY

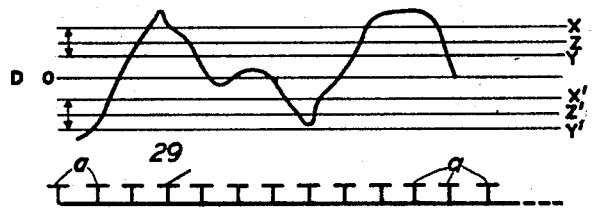

D  RECEIVED SIGNAL (WITH INTERFERENCE) Z-BIASING CURRENT

POSITION OF "CHOPPER" SEGMENTS

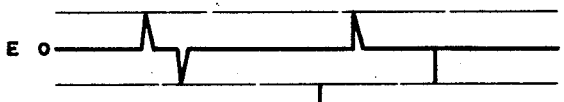

E  SECONDARY WINDING 23

F  SECONDARY WINDING 24

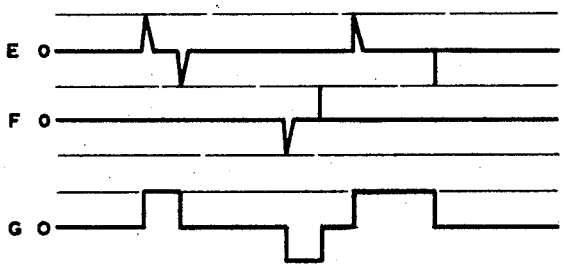

G  REPEATERED SIGNAL

WITHOUT "CHOPPER" SEGMENTS—IMPULSE COILS WORKING AT Z AND Z OF CURVE D

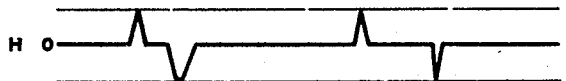

H  SECONDARY WINDING 23

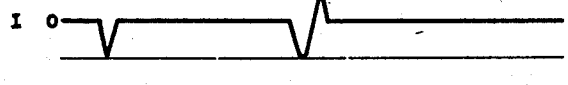

I  SECONDARY WINDING 24

J  REPEATERED WITHOUT USE OF "CHOPPER" SEGMENTS

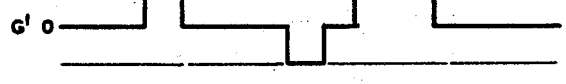

G'  REPEATERED WITH USE OF "CHOPPER" SEGMENTS

INVENTOR
E.T. BURTON
BY J. W. Schmied
ATTORNEY

Patented Aug. 23, 1932

1,873,283

UNITED STATES PATENT OFFICE

EVERETT T. BURTON, OF MILLBURN, NEW JERSEY, ASSIGNOR TO BELL TELEPHONE LABORATORIES, INCORPORATED, OF NEW YORK, N. Y., A CORPORATION OF NEW YORK

TELEGRAPH REPEATER

Application filed May 14, 1931. Serial No. 537,293.

This invention relates to regenerative repeaters employed in high speed signaling systems.

An object of the invention is to repeat an attenuated signal wave received from one line, as a square-topped wave having its impulses of a duration equal to that of a unit or multiple unit impulse, as originally transmitted, or less a unit pulse of each group, without resorting to the production of new impulses.

Heretofore various methods of and means for repeating high speed signals received from one line having a high attenuation characteristic, to another, have been employed. These methods and means comprise the use of high speed electromagnetic relays or various arrangements of space discharge devices. Electromagnetic relays received the incoming signals as a wave of gradually varying intensity and then produced new signals of corresponding polarity as a square-topped wave of uniform intensity for repeating over the outgoing line, as described in U. S. Patent 1,689,328 issued to A. M. Curtis on October 30, 1928. In the arrangement of space discharge devices the incoming signals are received as a wave of gradually varying intensity, amplified, corrected partially for phase and amplitude distortion occurring in the preceding transmission line, and then repeated as an amplified wave of gradually varying intensity, without resorting to the production of new signals, in a manner such as described in U. S. Patent 1,823,088, granted to A. A. Clokey and E. T. Burton, on September 15, 1931.

According to the present invention the incoming signal impulses are received as a wave of gradually varying intensity and impressed on a pair of biased high permeability transformers connected preferably in series, of the type disclosed in the copending application of E. T. Burton, Serial No. 280,709, filed May 26, 1928, which corresponds to British Patent 312,338, the complete specification of which was accepted June 10, 1930. The signals produce in the secondary windings of the transformers, pairs of voltage impulses of opposite polarity, the first of each pair corresponding to the rise and the second to the fall of the signal current in the primary windings. Therefore, a positive and negative impulse is produced in one secondary winding when the current variation in the primary winding is of positive polarity and a negative and a positive impulse in the other secondary winding when the primary current variation is of a negative polarity. Ordinarily the transmitted signal of two-unit lengths is, upon arrival at the repeating station, of sufficient intensity to reach the range wherein the inductance of the coil becomes effective to produce a pair of secondary impulses of opposite polarity as the signal current rises and falls through such range. Because of the rounded form of the received impulse the impulses so produced in either secondary winding are so close together that the signal repeated over the second cable may be of a length appreciably less than the duration of a two-unit impulse as ordinarily transmitted. By adding a fourth winding to each of the transformers, and connecting them in series through a rotating commutator device so as to insert in the magnetic fields of the transformers an intermittently closed circuit, the inductive action of the signal in the primary winding may be so varied that the time elapsing between successive impulses occurring in either secondary winding is increased to at least the duration of the unit or multiple unit length impulse. These impulses of altered duration are impressed upon the vacuum tube relay of the type disclosed in a copending application of E. T. Burton, Serial No. 490,585, filed October 23, 1920 wherein there is produced in the output circuit a three-element square-topped signal wave of uniform amplitude for transmission over the second cable.

A more complete understanding of the invention will be had from the following detailed description of a preferred embodiment and appended claims when taken in conjunction with the drawings, of which Fig. 1 illustrates the schematic circuit arrangement including a rotary device for short-circuiting the impulse producing transformer at regular intervals corresponding to the duration of perfect single signal pulses.

Fig. 2 shows curves representing the operation of the circuit arrangement of Fig. 1 with and without the short-circuiting means.

Referring to Fig. 1 which shows the preferred embodiment of the invention, attenuated signal impulses are received over cable 11, amplified by amplifier 12 (which may include a wave shaper and zero wander correction apparatus of any known type) and impressed through resistance 13 on to the primary windings 14 and 15, in series, of transformers 16 and 17. The transformers have core material of a high permeability at low magnetizing forces and are of the type disclosed in Fig. 8 of the Burton application, Serial No. 280,709, supra. The transformer cores are normally biased in opposite directions by current flowing from source 18 over parallel paths respectively including the biasing windings 19 and 20. Choke coils 21 and 22 prevent any flow of current in the biasing circuit due to voltages induced therein from the current in the primary winding. Inductively coupled with the primary and the biasing winding, as shown, are the secondary windings 23 and 24 and the "chopper" windings 25 and 26. The secondary windings are connected, as shown, to a repeater circuit of the type shown in Fig. 12 in the drawing of the Burton application Serial No. 490,585, supra. The various windings of the transformers 16 and 17 need not be entirely separate.

The "chopper" windings are connected in series to a rotary impulse distributing device 27 which is preferably of the commutator type. This device, which will hereinafter be referred to as the commutator, comprises a plurality of insulated contact bars $a$ and $b$ arranged to form a complete ring 28, and brush 29 which is adapted to engage the commutator bars successively as the ring is rotated. The contact bars are alternately positioned with respect to their angular length, there being an equal number of long and short bars. Assuming that the five-unit Baudot code is employed, there are provided five long and five short bars for each of the transmitters used at the sending station (not shown), a long bar having an angular length approximately 50% longer than that of a short bar. The long bars $a$ are connected in multiple and the short bars $b$ are insulated. The "chopper" winding 26 is connected at its free end to the multiple connector and the "chopper" winding 25 is connected at its free end to brush 29. Therefore as each of the long bars engage the brush a circuit including the "chopper" windings, is completed, the circuit being opened intermittently by the brush passing onto the short segments.

According to this operation voltage induction, that ordinarily takes place in the secondary windings 23 and 24 when the primary current passes through the range of intensities wherein the inductance rises to an effective value, is prevented until brush 29 engages a bar $b$. When the brush leaves a bar $a$ the "chopper" circuit is left unloaded and thereby conditions for induction of voltage one or the other of the secondary windings, depending on the polarity of the primary current impulse received at the time, wherein a sharp "kick" occurs, which will be of a polarity corresponding to the direction of the primary current impulse.

In explaining the operation of the "chopper" circuit it is well to state here that a characteristic feature of a transformer of the type employed in this invention is that when the secondary winding thereof is short-circuited during operation, as for example, by the closing of the "chopper" circuit, or loaded by a resistance across the windings, the output or secondary voltage impulse is very much broadened. When the short-circuit is opened or the load is suddenly released, the output voltage impulse changes abruptly to its normal value, provided, of course, that at the time of the opening of the short-circuit or removal of the load the primary current is of such value that a high secondary voltage would normally be produced. In other words, if the electrical condition of the transformer were in the "impulse region" when the load was removed, the secondary voltage impulse would follow instantly.

Should no "chopper" circuit be employed the incoming wave would be badly distorted, and the voltage impulses would occur in one or the other of the secondary windings at intervals influenced by the distortion and not at the exact instants corresponding to the beginning and the ending of the received impulses as is desired for repeating satisfactorily to cable 30. The "chopper" segments are arranged similar to the segments of the transmitting distributor at the sending station and therefore the "chopper" circuit permits the induced "kick" in the secondary circuit to occur at times which correspond to the beginning and the ending of the received impulses. The impulses are produced in one of the secondary windings at the instant brush 29 disengages any one of the long bars and thereby opens the short-circuit. These instants occur once for each unit impulse thereby effecting the coupling of one or the other of the secondary windings for very short intervals of time, spaced by the duration of one unit impulse as originally transmitted. If the signal impulse is changing in intensity i. e., if the primary current is passing through the range of intensities wherein the inductance is effective at the instant when coupling is effected, a sharp impulse of short duration is inducted in the secondary winding to operate the vacuum tube repeater which will be hereinafter described. If no slope in the primary current wave is in progress at this instant, nothing occurs.

By referring to Fig. 2 the operation may be briefly described as follows:

Curve A represents the signal wave transmitted from the distant station, the wave being made up of two positives, one negative, one positive, two negatives and three positive impulses.

Curve B is the wave corresponding to curve A (neglecting interference and assuming the usual amplification and wave shaping at the receiver, if they are necessary) as received in the system shown in Fig. 1, the time lag of cable 11 being ignored. It will be noted in curve B that the transmitted impulses of unit length have been practically eliminated by attenuation of the cable.

Curve C shows a square-topped wave resulting from the incoming wave shown in curve B should the latter be repeated by an electromagnetic mechanically operated relay. It is noted herein that the transmitted impulses of unit length are not repeated and that those of two or more units length are repeated as impulses minus one unit, the last impulses being furnished at the terminal station (not shown) by means of any one of the interpolating or vibrating relay circuits well known in the art.

Curve D shows the curve B as it would be distorted by interference in a condition as it might usually be received over a long submarine cable. $z$ and $z'$ represent the voltage of the biasing battery 18 with respect to the varying intensity of the incoming signal wave. $x$ and $y$ and $x'$ and $y'$ represent the limit of the ranges wherein the primary windings are effective as inductances and wherein voltage impulses may be induced in the secondary winding. Directly below curve D is shown the position of the commutator ring with respect to the incoming distorted wave of curve D. It will be noted that only bars $a$ are shown; the bars $b$ being left insulated, or dead, are omitted.

Curves E and F respectively show the voltage impulses induced in the secondary windings 23 and 24 by the wave of curve D when the latter flows through the primary windings 14 and 15. It will be noted that the impulses occur only when the brush 29 is out of engagement with the bars $a$. A better understanding will be had of these waves when compared with curves H and I below.

Curve G represents the effect of passing the voltage impulses as shown in curves E and F through a vacuum tube repeater having impulse lengthening means such as disclosed in the Burton application Serial No. 490,585, supra. It will be noted in the curve G that the duration of each lengthened repeated impulse is equal to that of a unit, or a multiple thereof, of the transmitted impulses of curve A.

Curves H, I and J represent the effects corresponding to those shown in curves E, F and G respectively when the "chopper" circuit is omitted.

Curves H and I are the voltage waves induced in the secondary windings 23 and 24 by the wave of curve D when the latter flows through the primary windings 14 and 15. It will be noted that the impulses of curves H and I are of longer duration than those shown in curves E and F. When the "chopper" circuit is employed the impulses shown in curves E and F, occur every time the "chopper" circuit is opened for a portion of each time interval wherein the impulses of curves H and I would have occurred if the "chopper" circuit had not been employed.

Curve J represents the effect of passing the impulses of curves H and I through the vacuum tube repeater.

Curve G' is identical with curve G and comparing curve G' with curve J it will be noted that there is a marked difference in the duration of the corresponding impulses repeated to cable 30. In curve G' the impulses are of unit or multiple unit length whereas in curve J there is no definite relationship between them.

A brief description will be given of the vacuum tube repeater circuit adapted for use with the present invention, where it is desired to repeat the impulses as three-element signals, that is, signals composed of impulses of positive, negative and zero polarity. A more complete description may be had by referring to the Burton application Serial No. 490,585, supra.

For the purpose of illustrating the operation of the three-element signal repeater circuit, the operation of one pair of vacuum tubes such as 31 and 32 (Fig. 1) will be described by itself so that a better understanding of the operation of the two pairs which operate in response to the positive and the negative sweeps, respectively, of effective amplitudes of the incoming signal waves, may be had. A pair of resistances 33 and 34 are connected in series with each other, the resistances forming a part of the plate circuits of the vacuum tubes 31 and 32 respectively. The grid circuits of the vacuum tubes 31 and 32 respectively are so connected that when space current flows in the plate circuit of either tube, the other tube is blocked by a negative polarity applied to the grid thereof by the potential drop across the resistance 33 or 34 in the plate circuit of the first tube. The grid circuit of vacuum tube 32 is connected across resistance 33 while the grid circuit of vacuum tube 31 is connected to form a closed series circuit with resistance 34, secondary winding 23 and grid leak resistance 41.

Let it be further assumed that the vacuum tube amplifier 42 is connected across resistance 34, instead of as shown, for the purpose of completing the operation of each pair of vacuum tubes separately. The input circuit of amplifier 42 is supplied with the potential drop across resistance 34. This circuit has only two points of stability. In one stable condition current flows through the resistance 34 and not through resistance 33, while in the other stable condition current flows through resistance 33 and not through resistance 34. The repeater remains in one or the other stable condition until the grid voltage is reversed by an impulse from the winding 23. By employing a transformer such as designated 16 which delivers a very short impulse of high amplitude, the time of signal cross-over, that is, reversal of polarity, in the output of the vacuum tube repeater may be reduced almost to zero. When such a transformer is employed the cross-over point on the incoming wave at which the repeater changes from one stable condition to another, is independent of the characteristics of the vacuum tubes and dependent upon the permeability and saturation points of the transformer. Inasmuch as the winding 23 is responsive to only the effective positive sweep of the incoming signal wave, as shown in curve E (Fig. 2), the output of vacuum tube 42 consists of a square-topped wave of impulses of positive polarity, each having a duration of the interval between the positive and negative impulses which occur in the winding 23 in response to each positive sweep of the incoming signal wave. The duration of the square-topped impulses in the output circuit depends on the number of impulse units in the positive sweep of the incoming signal impulse which produces the voltage impulses. The square-topped impulses are separated by intervals of zero voltage which correspond in duration to the time that a negative sweep of the incoming signal wave is being received. By employing a biasing winding on the transformer the duration of these square-topped impulses of zero intervals may be altered in accordance with the value of the biasing current.

When the other pair of vacuum tubes 35 and 36 are employed alone, in conjunction with secondary winding 24 wherein a negative and a positive voltage impulse is produced by each effective negative sweep of the incoming signal wave, as shown in curve F and the vacuum tube amplifier 42 is connected across resistance 38, the square-topped impulses of negative polarity only will be produced in the output circuit of the amplifier 42 in the same manner as described above for vacuum tubes 31 and 32.

When the two pairs of vacuum tubes are combined, the amplifier 42 is connected across the terminals 39 and 40, as shown in Fig. 1. The incoming signal wave, shown in curve D, produces a positive and negative voltage impulse in winding 23 every time the positive sweep of the incoming signal wave rises and falls through the line $z$ and a negative and a positive voltage impulse in winding 24 every time the negative sweep of the incoming signal wave falls and rises through line $z'$. The voltage impulses produced by the positive and negative sweeps, respectively, produce voltage drops across the resistances 34 and 38, but in opposite directions and during different intervals, so that a positive and negative voltage impulse produced in winding 23 causes a positive impulse to be produced in the output of amplifier 42 and a negative and a positive voltage impulse produced in winding 24 causes to be produced in the output circuit a negative impulse. The impulses in the output circuit are separated by intervals of zero voltage the duration of which impulses is determined by the value of the biasing current employed. A better understanding of the relative positions of the impulses produced in the output circuit can be had by referring to Figs. 7, 8, 9 and 10 in the drawing of the Burton application, Serial No. 490,585, supra. If desired, any usual type of transmitted signal wave shaping means may be connected to the cable 30.

By means of the above described circuit arrangement correction for an irregularity in the incoming signal wave is accomplished without producing new waves in place of those received as hereinfore was done with electromagnetic relays.

For receiving or monitoring, the impulses according to curve G, could be impressed upon an electromagnetic or other relay connected to terminals 39 and 40 or in the output circuit of tube 42.

It is understood that any suitable synchronizing circuit, such as disclosed in U. S. Patent 1,670,461 granted to G. A. Locke on May 22, 1928, may be connected to the amplifier 12 for maintaining the commutator 27 in synchronism with the incoming signals.

What is claimed is:

1. A synchronous impulse transmission system comprising an inductive device for repeating an incoming current impulse wave of slowly varying intensity as a plurality of short, sharp voltage impulses of high amplitude and of opposite polarities, characterized in this, that means are provided in said device for varying the short intervals between adjacent high voltage impulses of opposite polarities to the duration of a full impulse length, or its multiple, as originally transmitted.

2. A synchronous impulse transmission system comprising an inductive device for repeating an incoming current impulse wave of slowly varying intensity as a plurality of short, sharp voltage impulses of high amplitude, characterized in this, that means are provided in said device for repeating said high voltage impulses as a three-element square-topped wave of uniform amplitude, the duration of any impulse in the square-topped wave being equal to that of one or more unit length impulses as originally transmitted.

3. A synchronous impulse transmission system comprising an inductive device for repeating an incoming current impulse wave of slowly varying intensity as a plurality of short, sharp voltage impulses of higher amplitude, means in said device for varying the time interval between adjacent impulses of opposite polarities, and relay means for repeating said impulses as a square-topped wave of positive and negative polarities and of uniform amplitude, the duration of any impulse of the flat topped wave being equal to integer lengths of the impulses as originally transmitted.

4. A synchronous impulse transmission system, according to claim 3, wherein the first-mentioned means in said device comprises a rotary distributing member.

5. A synchronous impulse transmission system comprising a transformer for repeating an incoming current impulse wave of slowly varying intensity as a plurality of short, sharp voltage impulses of high amplitude and of alternately opposite polarities, means in the circuit of said transformer for varying the time intervals of zero voltage between adjacent high voltage impulses, and a relay device for repeating said high voltage impulses as a square-topped wave of impulses of positive or negative polarities of uniform amplitudes, said impulses being separated by zero voltage intervals, the duration of any impulse in the square-topped wave being equal to one or more integer length impulses as originally transmitted.

6. A synchronous impulse transmission system according to claim 5 wherein the repeating relay is adapted to convert two adjacent impulses of opposite polarities to form a single impulse of one or more unit lengths and of one polarity.

7. A synchronous impulse transmission system according to claim 5 wherein a winding on said transformer is arranged in an intermittently closed circuit for varying the intervals at which the impulses of said plurality occur.

8. A synchronous impulse transmission system according to claim 5 wherein windings on a second transformer are connected in series with the corresponding windings on the first transformer, said transformers having core material of like electrical characteristics but polarized in opposite directions to produce in said relay means a square-topped wave of both positive and negative polarities of uniform amplitude, the impulses of the last-mentioned being wave separated by zero voltage intervals.

9. A synchronous impulse transmission system comprising a plurality of magnetically biased transformers for repeating an incoming current impulse wave of slowly varying intensity as a plurality of short, sharp voltage impulses of high amplitude, means in the circuit of said transformers for varying the intervals between adjacent high voltage impulses of opposite polarities to be equivalent of an integer length impulse as originally transmitted.

10. A synchronous impulse transmission system comprising a plurality of transformers, each having a plurality of windings respectively connected in series with corresponding windings on the other, said transformers being arranged to repeat an incoming signal wave of slowly varying intensity as a plurality of groups of short, sharp voltage impulses of high amplitude, the polarity of said groups being alternately positive and negative, rotary means for varying the intervals of zero voltage between adjacent high voltage impulses, a plurality of thermionic discharge devices connected in the output circuit of each transformer for converting pairs of adjacent impulses of opposite polarities which have been altered by said rotary means, into a square-topped wave of positive and negative polarities of uniform amplitude, the impulses of the last-mentioned wave being separated by zero voltage intervals to effect a three-element signal wave.

11. A system for repeating regenerated signal impulses of corrected wave form comprising an electromagnetic core having a winding for applying received impulses, a winding for taking off output impulses, a polarizing winding in circuit with a source for applying an electromotive force of such value that the flux in said core changes rapidly over a small part only of the range of normal intensity of applied signal impulses, and another winding on said core having its circuit connected with a circuit interrupter which is synchronized with the source of the impulses to be repeated.

In witness whereof, I hereunto subscribe my name this 12th day of May, 1931.

EVERETT T. BURTON.